United States Patent [19]

Kondo

[11] Patent Number: 4,774,542
[45] Date of Patent: Sep. 27, 1988

[54] APPARATUS FOR FORMING IMAGES OF OBJECTS AT DIFFERENT LOCATIONS

[75] Inventor: Kazuyuki Kondo, Kawasaki, Japan
[73] Assignee: Canon Kabushiki Kaisha, Tokyo, Japan
[21] Appl. No.: 921,432
[22] Filed: Oct. 22, 1986
[30] Foreign Application Priority Data
  Oct. 28, 1985 [JP] Japan .................. 60-240754
[51] Int. Cl.[4] ............................. G03G 15/00
[52] U.S. Cl. .................... 355/3 R; 355/7; 355/11; 355/65; 355/66
[58] Field of Search ............. 355/3 R, 7, 11, 64–66

[56] References Cited

U.S. PATENT DOCUMENTS 4,170,412 10/1979 Grace et al. ............... 355/11 X
4,415,260 11/1983 Kasuga et al. ............. 355/8 X Primary Examiner—R. L. Moses
Attorney, Agent, or Firm—Fitzpatrick, Cella, Harper & Scinto

[57] ABSTRACT

An image forming apparatus has a first body capable of containing a movable photosensitive member therein and having first optics for applying, in a first mode, image information light obtained in the first body to the photosensitive member and forming an image on the photosensitive member, and a second body connected to the first body and having second optics for directing, in a second mode, an image information light obtained in the second body to the first body and forming an image on the photosensitive member in the first body. The width of the image formation area with respect to a direction orthogonal to the direction of movement of the photosensitive member is smaller in the second mode than in the first mode.

21 Claims, 3 Drawing Sheets even if a mounting error is present when a first body having a photosensitive member and first optical means and a second body having second optical means are mounted relative to each other.

Further objects of the present invention will become apparent from the following detailed description of the invention taken in conjunction with the accompanying drawings.

APPARATUS FOR FORMING IMAGES OF OBJECTS AT DIFFERENT LOCATIONS

BACKGROUND OF THE INVENTION

1. Field of the Invention

This invention relates to an image forming apparatus in which different image information lights can be applied from a plurality of positions to a photosensitive member for forming an image thereon.

2. Related Background Art

In recent years, attention has been paid to an apparatus for forming an image by effecting image exposure from a plurality of different positions to a photosensitive member, because of its multiple functions.

For example, apparatuses which have a recorded surface on which recording can be effected by writing means and an original carriage for supporting an original thereon and in which both of the copying of the image recorded on the recorded surface and the copying of the original placed on the original carriage are possible are conceived in Japanese Laid-Open Patent Applications Nos. 92626/1976 and 164770/1985. Such image forming apparatuses are very convenient in that the image of the recorded surface is recorded on plain paper by the electrophotographic system and therefore clear-cut images can be obtained and moreover, the copying of either of the original and the recorded image is possible in conformity with the operator's circumstances.

In such apparatuses, however, it is necessary that image lights emitted from a plurality of different positions be accurately aligned with a predetermined position relative to a photosensitive member. This alignment is very difficult and positional deviation may occur, whereby a part of the image may become missing and in some cases, a desired image cannot be obtained.

The following three points may be chiefly mentioned as the causes which promote such positional deviation.

(1) Where the positions at which image information lights are produced differ from each other, a special optical system is more necessary than in the conventional copying apparatus, laser beam printer or the like wherein an image light is applied from a single position.

(2) Where a separate body which emits another image information light is mounted relative to an image forming apparatus body, any error of the mounting appears directly as optical positional deviation. This is more remarkable where the apparatus body and the separate body are removably mountable with respect to each other.

(3) Where the optical lengths until the image information lights arrive at the photosensitive member differ from each other, the difference between the optical lengths leads to a difference in optical accuracy.

SUMMARY OF THE INVENTION

It is an object of the present invention to provide an image forming apparatus which can obtain desired images without any image becoming missing even where the apparatus has a plurality of optical systems.

It is another object of the present invention to provide an image forming apparatus which can obtain desired images even if the lengths of the optical paths of a plurality of optical systems differ from each other and even where any of the optical systems is used.

It is still another object of the present invention to provide an image forming apparatus which can obtain desired images even if a mounting error is present when a first body having a photosensitive member and first optical means and a second body having second optical means are mounted relative to each other.

Further objects of the present invention will become apparent from the following detailed description of the invention taken in conjunction with the accompanying drawings.

DESCRIPTION OF THE PREFERRED EMBODIMENTS

Figure 1:
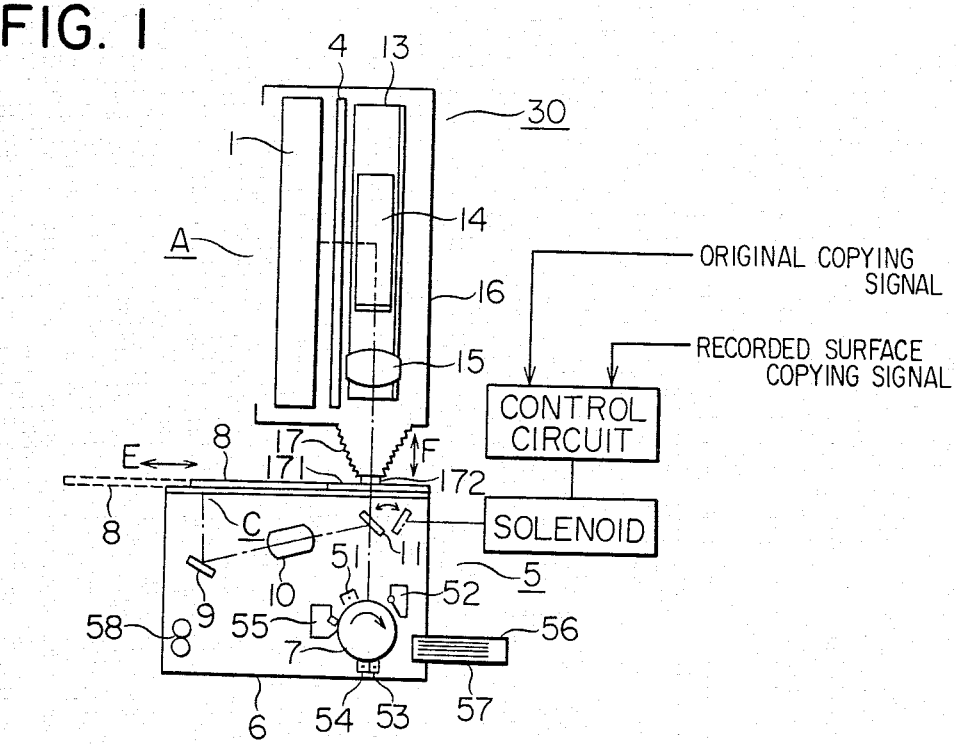
FIG. 1 is a cross-sectional view of an image forming apparatus to which the present invention is applicable.

The present invention will hereinafter be described with reference to the drawings throughout with functionally similar members are given similar reference numerals.

Figure 2:
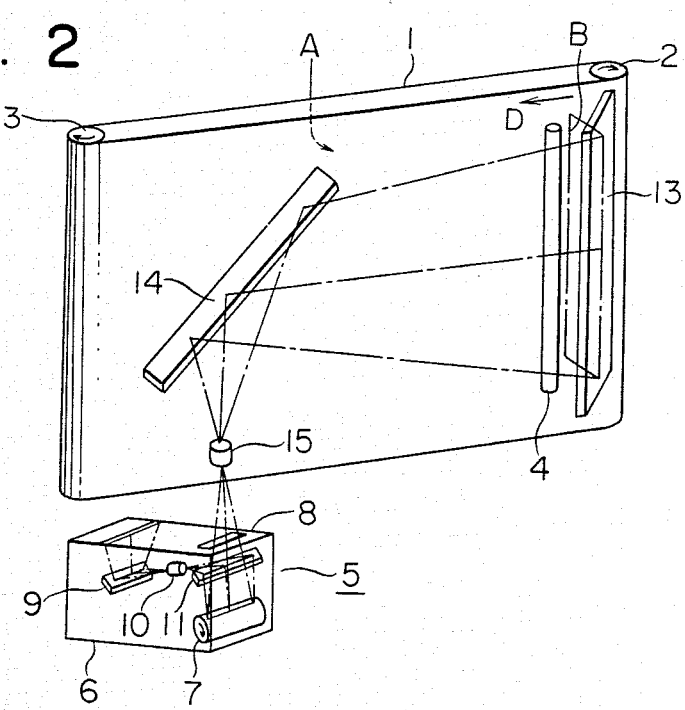
FIG. 2 is a perspective view of the image forming apparatus of FIG. 1.

FIGS. 1 and 2 show an image forming apparatus to which the present invention is applicable, FIG. 1 being a cross-sectional view, and FIG. 2 being a perspective view.

Reference numeral 30 designates a second unit or body mounted with respect to a first body 5. Reference numeral 1 denotes a white or light-colored, flexible, planar recorded surface member such as a wide synthetic resin belt capable of recording by writing means and erasing recorded images. The recorded surface member 1 is disposed upright between rollers 2 and 3. The recorded surface is substantially planar in a vertical direction and is movable in the direction of arrow D by the rollers 2 and 3 being rotated in the direction of arrow, and at this time, recorded information is scanned and projected onto a photosensitive member by an optical system to be described. Desired information is recorded on the surface of the member 1 which is indicated by A, by suitable writing means, and the recorded information is illuminated on the surface B opposite to the surface A by a lamp 4 through the rotation of the rollers 2 and 3 and is scanned.

Reference numeral 5 denotes a copying process unit having in a box member 6 an electrophotographic photosensitive member 7 rotatable in the direction of arrow. A primary charger 51 for uniformly charging the photosensitive member, a developing device 52, a transfer charger 53, a separation charge eliminator 54 and a cleaning device 55 are provided around the photosensitive member, and on the other hand, transfer materials 57 on which information is to be recorded are supplied from a paper supply cassette 56 to the transfer charger position. A fixing device 58 for fixing toner images transferred to the transfer materials is provided at a predetermined location, and images are formed on the recording materials by the well-known electrophotographic process.

A movable original carriage 8 is mounted on top of the box member 6. In the original or first copying mode, an original to be copied such as a document is placed on the original carriage 8, which is moved forward in the direction of arrow substantially perpendicular to the direction of movement of the member 1, whereby the original is scanned. When the scanning of the original is terminated, the carriage 8 is moved backward to its home position, i.e., a position in which it is proximate to or bears against a frame bed 171. During the scanning of the original, the image of the original placed on the carriage 8 is formed and exposed on the photosensitive member 7 by an imaging optical system comprising mirrors 9 and 11 and a lens 10 disposed in the box member 6. This exposure position is a position between the primary charger and the developing device. The second imaging optical system of the copying process unit 5 is such that the image of the original is slit-exposed through an opening portion C which is a position fixed relative to the box member 6 and the reflected light therefrom is projected in the form of a slit onto the photosensitive member 7.

Thus, an electrostatic latent image corresponding to the image of the original is formed on the photosensitive member and the image is formed on the recording material by the above-described electrophotographic process.

On the other hand, when the image recorded on the recorded surface 1 is to be copied, a solenoid is operated on the basis of a recorded surface copying signal provided from the unit 30 and the second mirror 11 is retracted to a position for the second recorded surface mode indicated by dotted line outside the optical path. When an original copying signal provided in the box member 6 is input to a control unit, the solenoid is deenergized. Thereby, the second mirror is moved to a position for original mode indicated by solid line.

Thus, in the recorded surface mode, the light from the recorded surface illuminated by the lamp 4 constituting a first imaging optical system is reflected laterally along the recorded surface, and a second mirror 14 reflects said light from the first mirror 13 downwardly along the recorded surface. A lens 15 receives the light from the second mirror 14 and forms the image of the recorded surface on the photosensitive member 7.

As is apparent from the drawings, the length of the optical path of the light including the recorded information written on the recorded surface (the optical length from the recorded surface to the photosensitive member) is set to a value greater than the length of the optical path of the light including the original information (the optical length from the original carriage to the photosensitive member).

The separate unit 30 has a mounting-dismounting portion 172 for mounting and dismounting it with respect to the copying process unit, and may be mounted with respect to the copying process unit by the mounting-dismounting portion 172 being engaged with the frame bed 171, and may be dismounted in the direction of arrow F by the mounting-dismounting portion 172 being disengaged from the frame bed 171. The mounting-dismounting portion 172 and the frame bed 171 are formed with a slit for directing the light beam from the recorded surface to the copying process unit.

In such an apparatus, as previously described, the optical alignment of the first imaging optical system for copying the recorded surface (hereinafter referred to as the recorded surface mode) and the second imaging optical system for copying the original placed on the original carriage (hereinafter referred to as the original mode) is very difficult in manufacture.

Figure 3:
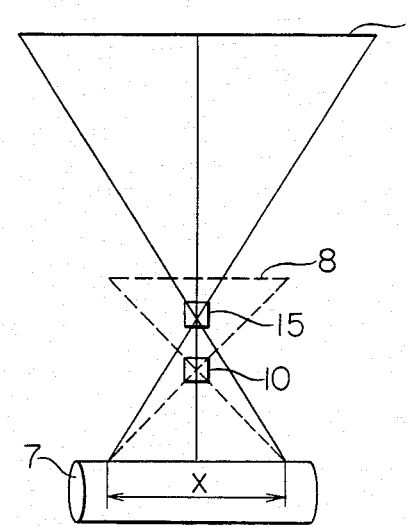
FIGS. 3 and 4 illustrate the present invention.

FIG. 3 is an illustration showing the optical paths of the above-described optical system in plan view. In FIG. 3, the optical path indicated by dotted lines is the optical path during the original mode and the optical path indicated by solid lines is the optical path during the recorded surface mode.

The image exposure area X on the photosensitive member 7 (which area is an area to which a light concerned in the image is applied when images of the same size are to be obtained during the two modes) should desirably be equal during the original mode and during the recorded surface mode, but when the positional accuracy error or the like of the optical system during manufacture is taken into account, it is very difficult due to one or more of the aforementioned three factors to set the optical paths as shown in FIG. 3. It would also occur to mind for the user to adjust the positional accuracy while looking at the copied image, but this would be cumbersome to the operator in that not only wasteful copying is done repeatedly but also very much time and labor is required.

Figure 4:
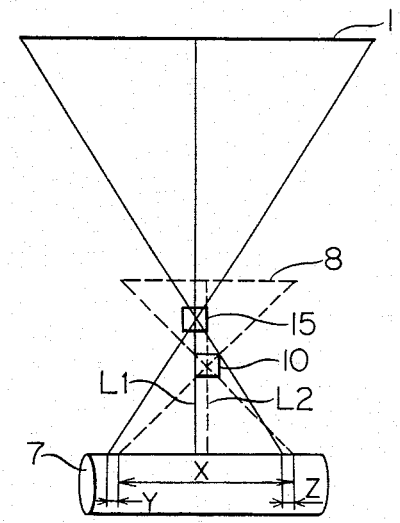

For example, if as shown in FIG. 4, the image exposure area during the recorded surface mode becomes irregular to the right or left, i.e., in the direction orthogonal to the direction of movement of the photosensitive member, relative to the image formation area during the original mode, due to the positional error or the like of the optical system (the optical center becomes irregular for $L_1$ and $L_2$), an area Y situated in the non-image area (which is an area not transferred onto the transfer material and includes the blank for the binding margin and the blank for separation) will not be transferred onto the transfer material and the image of this area will become missing because the copying process unit is set in contrast with the optical setting during the original mode. Also, as regards an area Z which is of the same size as the area Y, the recording process will be executed in spite of this area being not concerned with the image.

Figure 5:
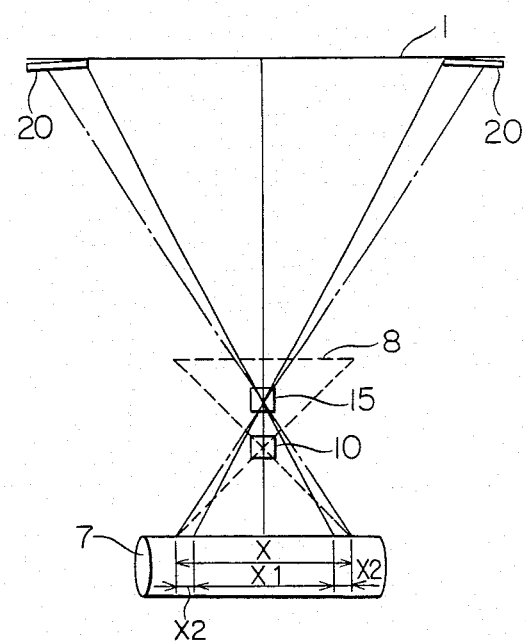
FIGS. 5 and 6 illustrate an embodiment of the present invention.
Figure 6:
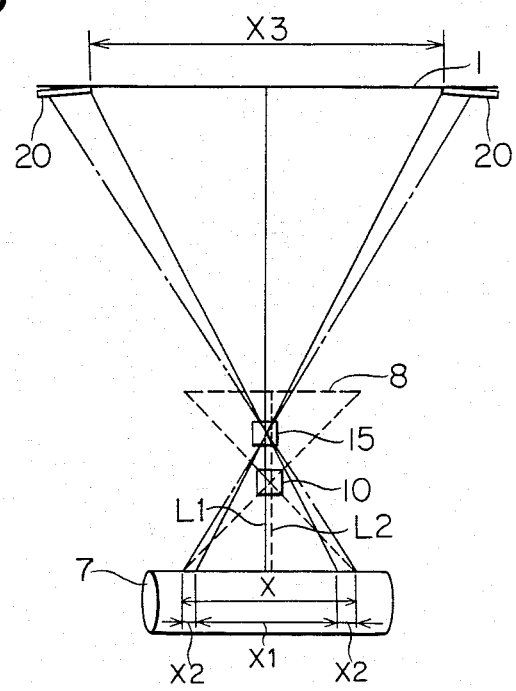

FIGS. 5 and 6 illustrate an embodiment of the present invention as it is applied to the apparatus of FIGS. 1 and 2.

The lens 15 is so set that the exposure area X of the image information light in the recorded surface mode is small relative to the exposure area X of the image information light in the original mode.

Thus, as shown in FIG. 6, even if a predetermined magnification is departed from due to the deviation of the optical position or the fluctuation of the length of the optical path, the image exposure area X during the recorded surface mode will be included in the image exposure area X during the original mode and therefore, the image will not become missing during both modes.

This mode for making the image exposure area small may be either of the two modes, but where the optical system is in the same body as the photosensitive member, the recording process means are set relative to the optical accuracy in this body and therefore, it is preferable that the exposure area of the image information light during a mode which uses another body connected to the body containing the photosensitive member therein be made small.

Also, where the lengths of the optical paths of the image information lights differ from each other, either mode will do, but a greater length of the optical path will result in lower optical accuracy and therefore, it is preferable that the exposure area of the image information light in the mode during which the length of the optical path is greater be made small relative to the mode during which the length of the optical path is shorter.

The direction in which the area is made small may be only the direction orthogonal to the direction of movement of the photosensitive member, but if the area is made small in the direction of movement of the photosensitive member as well, the image will become generally smaller, and this is more preferable.

Further, in the embodiment of FIGS. 5 and 6, an area X2 corresponding to the difference between the area X and X1 is subjected to the image forming process, whereby developer is consumed wastefully or appears as black lines on the transfer material to reduce the quality of the recorded image on the transfer material, and in order to prevent this, processing is applied to make the difference area X2 into a non-image area.

That is, reflecting members 20 are disposed near the opposite ends of the recorded surface in a direction orthogonal to the direction of movement of the recorded surface. These reflecting members are provided so that the inner ends thereof are situated at the ends of the copiable area X3 of the recorded surface, whereby the difference area X2 is exposed and made into a non-image area. Thus, even during the recorded surface mode, wasteful consumption of the developer and production of black lines on the transfer material can be prevented.

Where the recorded surface is white, the means for making the difference area X2 into a non-image area may be provided by making the recorded surface 1 larger than the copiable area so that the end portions of the recorded surface may be used also as the non-image areas.

Also, in order to prevent black lines from appearing in the formed image due to the deterioration resulting from contamination, the use of a high reflection material such as aluminum brilliance alloy for the reflecting members 20 and further, the use of a lamp light, is preferable.

The location of the reflecting members 20 may be anywhere between the vicinity of the shown white recorded surface 1 and the lens 15 depending on the material used, and the shape thereof may be determined as desired within range which will not adversely affect the image exposure area of the recorded surface.

The foregoing description has been made with respect to a case where the portion of the photosensitive member which is of high potential is developed, but in a case where the portion of the photosensitive member which is of low potential is developed, that is, in the use of so-called inversion development, the difference area X2 is not developed and therefore the reflecting members 20 need not be provided.

The present invention has been described with respect to an apparatus having a recorded surface on which recording can be effected by writing means and an original carriage, whereas the invention is not restricted thereto, but is applicable to any apparatus such as a copying apparatus or a laser beam printer to which an attachment for microfilm can be attached and in which image information lights can be obtained from two different positions and these image information lights are directed to the same position or the same photosensitive member.

The photosensitive member may be of any shape such as a drum-like shape or a belt-like shape, and further may be even photosensitive paper.

Of course, the present invention is also applicable to apparatuses with which transfer materials of plural sizes can be used and apparatuses in which image formation at a plurality of magnifications is possible.

Also, the present invention covers any combination thereof.

What is claimed is:

1. An image forming apparatus comprises:
    A first body capable of containing a movable photosensitive member therein and having first optical means for applying, in a first mode, an image information light obtained in said first body to said photosensitive member and forming an image on said photosensitive member; and
    a second body optically connected to said first body and having second optical means for directing, in a second mode, an image information light obtained in said second body into said first body and forming an image on said photosensitive member in said first body;
    wherein the width of the image formation area with respect to a direction orthogonal to the direction of movement of said photosensitive member is smaller in said second mode than in said first mode; and
    non-image means for making the portion of said photosensitive member other than the image formation area in the second mode a non-image area.

2. An image forming apparatus according to claim 1, further comprising means adapted to assume a position in the second mode to open a part of the optical path in said first mode in said second mode, thereby enabling the application of light from said second body to said photosensitive member in said first body.

3. An image forming apparatus according to claim 1, wherein said non-image making means is provided in said second body.

4. An image forming apparatus according to claim 1, wherein said non-image making means is light applying means for exposing the charged photosensitive member to light.

5. An image forming apparatus according to claim 1, wherein said first body and said second body are removably mountable with respect to each other.

6. An image forming apparatus according to claim 1, wherein the image formation area in a direction orthogonal to the direction of movement of said photosensitive member in said second mode is located in the image formation area in said first mode.

7. An image forming apparatus comprising:
    a first body having an exposure station, a transfer station, a photosensitive member movable through said stations, and first optical means for applying a light including first image information to said photosensitive member in said exposure station;
    a second body optically connected to said first body and having second optical means for directing a light including second image information into said first body to apply such light to said photosensitive member;
    wherein in a first mode an image on said photosensitive member is formed on the basis of the first image information light obtained in said first body and in a second mode an image is formed on said photosensitive member in said first body on the basis of the second image information light obtained in said second body, the width of the image formation area with respect to a direction orthogonal to the direction of movement of said photosensitive member being smaller for transfer materials of the same size in said second mode than in said first mode; and non-image means for making the portion of said photosensitive member other than the image formation area in the second mode a non-image area.

8. An image forming apparatus according to claim 7, further comprising means adapted to assume a position in the second mode to open a part of the optical path in said first mode in said second mode, thereby enabling the application of light from said second body to said photosensitive member in said first body.

9. An image forming apparatus according to claim 7, wherein said non-image making means is provided in said second body.

10. An image forming apparatus according to claim 7, wherein said non-image making means is light applying means for exposing the charged photosensitive member to light.

11. An image forming apparatus according to claim 7, wherein said first body and said second body are removably mountable with respect to each other.

12. An image forming apparatus according to claim 7, wherein the image formation area in a direction orthogonal to the direction of movement of said photosensitive member in said second mode is located in the image formation area in said first mode.

13. An image forming apparatus having:
a movable photosensitive member;
an original carriage on which an original is placed;
first optical means for exposing the original to light and directing the reflected light therefrom to a predetermined location on said photosensitive member;
wherein in an original mode an image corresponding to the image of the original is formed by the use of said first optical means;
a recorded surface on which recording can be effected by writing means; and
second optical means for exposing said recorded surface to light and directing the reflected light therefrom to a predetermined location on said photosensitive member;
wherein in a recorded surface mode an image corresponding to the recorded surface is formed by the use of said second optical means; and
wherein the optical length from the recorded surface to the photosensitive member in the recorded surface mode is set to a value greater than the optical length from the original to the photosensitive member in the original mode, and the image exposure width with respect to a direction orthogonal to the direction of movement of said photosensitive member is smaller in the recorded surface mode than in the original mode.

14. An image forming apparatus according to claim 13, further comprising non-image making means for making non-image relative to the outside of the image exposure width with respect to a direction orthogonal to the direction of movement of said photosensitive member in said second mode.

15. An image forming apparatus according to claim 14, wherein said non-image making means is light applying means for exposing the charged photosensitive member to light.

16. An image forming apparatus according to claim 15, wherein said light applying means has light reflecting members provided near the opposite ends of the recorded surface.

17. An image forming apparatus according to claim 16, wherein said recorded surface is movable and exposed to light by the movement thereof, and said light reflecting members are provided at the opposite ends orthogonal to the direction of movement of said recorded surface.

18. An image forming apparatus according to claim 15, wherein said recorded surface is white and serves also as said light reflecting members.

19. An image forming apparatus comprising:
a photosensitive member;
first optical means used in a first mode for applying a light including first image information to said photosensitive member; and
second optical means used in a second mode for applying a light including second image information to said photosensitive member;
wherein the length of a second optical path until the second image information light in said second mode arrives at said photosensitive member is longer than the length of a first optical path until the first image information light in said first mode arrives at said photosensitive member; and
wherein the image formation area on said photosensitive member in said second mode is smaller than in said first mode.

20. An image forming apparatus according to claim 19, wherein the image formation area in said second mode is included within the image formation area in said first mode.

21. An image forming apparatus according to claim 20, further comprising non-image making means for making the difference area between the image formation areas in said first mode and said second mode into a non-image area.

* * * * *

UNITED STATES PATENT AND TRADEMARK OFFICE
CERTIFICATE OF CORRECTION

PATENT NO. : 4,774,542

DATED : September 27, 1988

INVENTOR(S) : KAZUYUKI KONDO

It is certified that error appears in the above-identified patent and that said Letters Patent is hereby corrected as shown below:

COLUMN 2

Line 23, "are" should be deleted.

COLUMN 3

Line 26, "second recorded" should read --second or recorded--.

COLUMN 5

Line 42, "within range" should read --within a range--.

COLUMN 6

Line 7, "A" should read --a--.

Signed and Sealed this

Second Day of January, 1990

Attest:

JEFFREY M. SAMUELS

Attesting Officer    Acting Commissioner of Patents and Trademarks